United States Patent
Fischer et al.

(10) Patent No.: US 7,250,230 B2
(45) Date of Patent: Jul. 31, 2007

(54) WATER FILTER FOR AN ELECTROCHEMICAL FUEL CELL SYSTEM

(75) Inventors: Ralph Fischer, Stuttgart (DE); Myles L. Bos, Burnaby (CA)

(73) Assignee: NuCellSys GmbH, Kirchheim/Teck-Nabern (DE)

( * ) Notice: Subject to any disclaimer, the term of this patent is extended or adjusted under 35 U.S.C. 154(b) by 0 days.

(21) Appl. No.: 10/924,728

(22) Filed: Aug. 23, 2004

(65) Prior Publication Data
US 2006/0037904 A1 Feb. 23, 2006

(51) Int. Cl.
*C02F 1/28* (2006.01)
(52) U.S. Cl. .................. 429/19; 210/251; 210/258; 210/259; 210/287; 210/290; 210/502.1
(58) Field of Classification Search ............... 210/251, 210/259, 258, 287, 290, 502.1; 429/19
See application file for complete search history.

(56) References Cited

U.S. PATENT DOCUMENTS

| | | | |
|---|---|---|---|
| 4,017,422 A | * | 4/1977 | Gappa et al. ............... 502/34 |
| 4,276,180 A | * | 6/1981 | Matson ........................ 210/683 |
| 5,360,679 A | | 11/1994 | Buswell et al. .............. 429/19 |
| 5,980,716 A | * | 11/1999 | Horinouchi et al. ........ 204/524 |
| 6,265,024 B1 | | 7/2001 | England ...................... 427/203 |
| 6,316,134 B1 | | 11/2001 | Cownden et al. ............ 429/19 |
| 2003/0127393 A1 | | 7/2003 | Tepper et al. ............... 210/656 |

FOREIGN PATENT DOCUMENTS

WO  WO 02/36234 A1  5/2002

OTHER PUBLICATIONS

St-Pierre, J., et al., "Relationships Between Water Management, Contamination and Lifetime Degradation in PEFC", *J. New Materials for Electrochemical Systems* 3: 99-106, 2000.

* cited by examiner

*Primary Examiner*—Matthew O. Savage
(74) *Attorney, Agent, or Firm*—Crowell & Moring LLP

(57) ABSTRACT

Silica may form as a degradation product in an electrochemical fuel cell system and may be found within the water management subsystem thereof. The silica may polymerize and/or react to form insoluble metal silicates which may lead to reduced lifetime or performance of individual components within the fuel cell system. These problems can be eliminated or reduced by adding a silica absorber such as aluminum, either as alumina granulate or an aluminum plate to the water management subsystem, for example in, upstream and/or downstream of the water filter. In addition, the silica absorber may be in, upstream and/or downstream of the water tank.

11 Claims, 6 Drawing Sheets

WATER FILTER FOR AN ELECTROCHEMICAL FUEL CELL SYSTEM

BACKGROUND OF THE INVENTION

1. Field of the Invention

The present invention relates to water filters for electrochemical fuel cells and more particularly for water filters in a water management subsystem for an electrochemical fuel cell system.

2. Description of the Related Art

Electrochemical fuel cells convert reactants, namely fuel and oxidant fluid streams, to generate electric power and reaction products. Electrochemical fuel cells employ an electrolyte disposed between two electrodes, namely a cathode and an anode. The electrodes each comprise an electrocatalyst disposed at the interface between the electrolyte and the electrodes to induce the desired electrochemical reactions. The location of the electrocatalyst generally defines the electrochemically active area.

Polymer electrolyte membrane (PEM) fuel cells generally employ a membrane electrode assembly (MEA) consisting of an ion-exchange membrane disposed between two electrode layers comprising porous, electrically conductive sheet material as fluid diffusion layers, such as carbon fiber paper or carbon cloth. In a typical MEA, the electrode layers provide structural support to the ion-exchange membrane, which is typically thin and flexible. The membrane is ion conductive (typically proton conductive), and also acts as a barrier for isolating the reactant streams from each other. Another function of the membrane is to act as an electrical insulator between the two electrode layers. The electrodes should be electrically insulated from each other to prevent short-circuiting. A typical commercial PEM is a sulfonated perfluorocarbon membrane sold by E.I. Du Pont de Nemours and Company under the trade designation NAFION®.

The MEA contains an electrocatalyst, typically comprising finely comminuted platinum particles disposed in a layer at each membrane/electrode layer interface, to induce the desired electrochemical reaction. The electrodes are electrically coupled to provide a path for conducting electrons between the electrodes through an external load.

In a fuel cell stack, the MEA is typically interposed between two separator plates that are substantially impermeable to the reactant fluid streams. The plates act as current collectors and provide support for the electrodes. To control the distribution of the reactant fluid streams to the electrochemically active area, the surfaces of the plates that face the MEA may have open-faced channels formed therein. Such channels define a flow field area that generally corresponds to the adjacent electrochemically active area. Such separator plates, which have reactant channels formed therein are commonly known as flow field plates. In a fuel cell stack a plurality of fuel cells are connected together, typically in series, to increase the overall output power of the assembly. In such an arrangement, one side of a given plate may serve as an anode plate for one cell and the other side of the plate may serve as the cathode plate for the adjacent cell. In this arrangement, the plates may be referred to as bipolar plates.

The fuel fluid stream that is supplied to the anode typically comprises hydrogen. For example, the fuel fluid stream may be a gas such as substantially pure hydrogen or a reformate stream containing hydrogen. Alternatively, a liquid fuel stream such as aqueous methanol may be used. The oxidant fluid stream, which is supplied to the cathode, typically comprises oxygen, such as substantially pure oxygen, or a dilute oxygen stream such as air. In a fuel cell stack, the reactant streams are typically supplied and exhausted by respective supply and exhaust manifolds. Manifold ports are provided to fluidly connect the manifolds to the flow field area and electrodes. Manifolds and corresponding ports may also be provided for circulating a coolant fluid through interior passages within the stack to absorb heat generated by the exothermic fuel cell reactions.

In conventional solid polymer fuel cell stacks, cooling of the fuel cells is typically accomplished by providing cooling layers disposed between adjacent pairs of stacked fuel cells. Often the cooling layer is similar in design to a reactant flow field plate wherein a coolant, typically water, is fed from an inlet manifold and directed across the cooling plate in channels to an outlet manifold. This type of fuel cell stack typically requires three plates between each adjacent MEA, namely an anode plate, a cathode plate and a cooling plate. The coolant channels thus superpose the active area of the fuel cell. In operation, heat generated in the fuel cells is drawn away from each fuel cell by the coolant through the thickness of the plates perpendicular to the plane of the fuel cell assemblies. Heat is then transferred to and carried away by a circulating coolant. Cooling with an additional coolant layer can be called "interstitial" cooling.

It is desirable to seal reactant fluid stream passages to prevent leaks or inter-mixing of the fuel and oxidant fluid streams. U.S. Pat. No. 6,057,054, incorporated herein by reference in its entirety, discloses a sealant material impregnating into the peripheral region of the MEA and extending laterally beyond the edges of the electrode layers and membrane (i.e. the sealant material envelopes the membrane edge).

For a PEM fuel cell to be used commercially in either stationary or transportation applications, a sufficient lifetime is necessary. For example, 5,000 hour operations may be routinely required. In practice, there are significant difficulties in consistently obtaining sufficient lifetimes as many of the degradation mechanisms and effects remains unknown. Accordingly, there remains a need in the art to understand degradation of fuel cell components and to develop design improvements to mitigate or eliminate such degradation. The present invention fulfills this need and provides further related advantages.

BRIEF SUMMARY OF THE INVENTION

A possible degradation product in fuel cell systems is silica that can be found in soluble or insoluble forms within the water management subsystem of an electrochemical fuel cell system and may react with metal particulates or metal surfaces to form metal silicates. In particular, silica scale may be found within the humidification subsystem of the fuel cell system. Such degradation products building up and collecting on fuel cell components may lead to reduced performance and/or reduced lifetime of the fuel cell components or the system as a whole. The water management subsystem may supply deionized water to one or all of the humidification subsystem for humidifying the oxidant stream, the fuel stream or both; the fuel processing subsystem; or the electrochemical fuel cell stack for cooling purposes.

To remove silica from the fuel cell system, a silica absorber may be present. More particularly, an electrochemical fuel cell system may comprise an electrochemical fuel cell stack and a water management subsystem which comprises a water tank, a water filter, a silica absorber and a pump all fluidly connected.

In an embodiment, the silica absorber is within a separate compartment of the water filter. Alternatively, the silica absorber may be in a separate cartridge and either upstream, downstream or both from the water filter. The silica absorber may comprise, for example, aluminum. In particular, the silica absorber may be aluminum oxide (also known as alumina). In a more specific embodiment, the silica absorber may be alumina granulate with a specific surface area of 100 to 240 m²/g. The silica absorber may also comprise activated carbon. If a combination of alumina and activated carbon is used, then the particles can be mixed within a single compartment or isolated in separate compartments of the same or different cartridge.

Similarly, the silica absorber may be in the water tank, for example as an aluminum plate located within the water tank. Alternatively or in addition, a silica absorber may be upstream, downstream or both of the water tank.

These and other aspects of the invention will be evident upon reference to the attached figures and following detailed description.

BRIEF DESCRIPTION OF THE DRAWINGS

In the above figures, similar references are used in different figures to refer to similar elements.

DETAILED DESCRIPTION OF THE INVENTION

Figure 1:
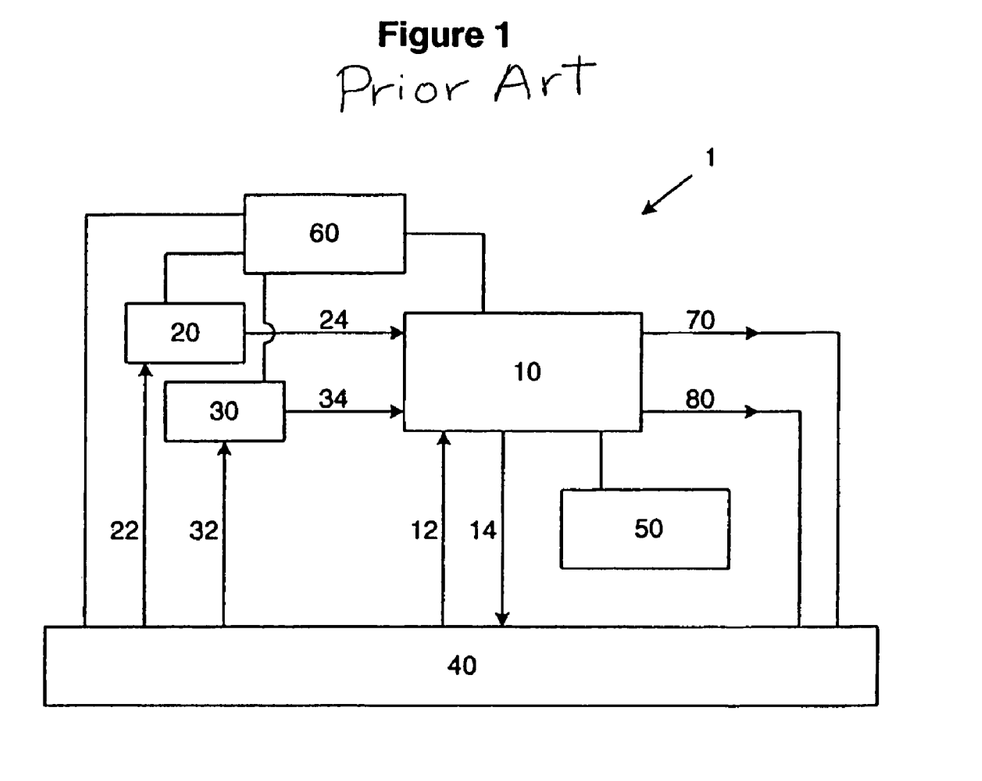
FIG. 1 is a schematic of a fuel cell system.

A hydrocarbon fueled proton exchange membrane fuel cell electric power generation system is the subject of commonly-owned U.S. Pat. Nos. 5,360,679 and 6,316,134 which are hereby incorporated by reference in their entirety. FIG. 1 is a schematic of the fuel cell system 1 as described in the '679 patent. In particular, the elements of fuel cell system 1 comprise:

an electric power generation subsystem 10 for producing electricity, heat, and water from a hydrogen-containing fuel stream and an oxidant stream;

a fuel processing subsystem 20 for producing a hydrogen-rich fuel for the electric power generation subsystem 10;

an oxidant subsystem 30 for delivering pressurized oxidant to the electric power generation subsystem 10;

a water management subsystem 40 for recovering the water produced in the electric power generation subsystem 10 and optionally for cooling the electric power generation subsystem 10; glycol) to the fuel cell stack, in which case the water management subsystem is independent of the cooling of the fuel cell stack. In any event, most, if not all fuel cell systems will contain a water management subsystem for at least one of the functions of cooling, fuel processing and humidifying.

Figure 3:
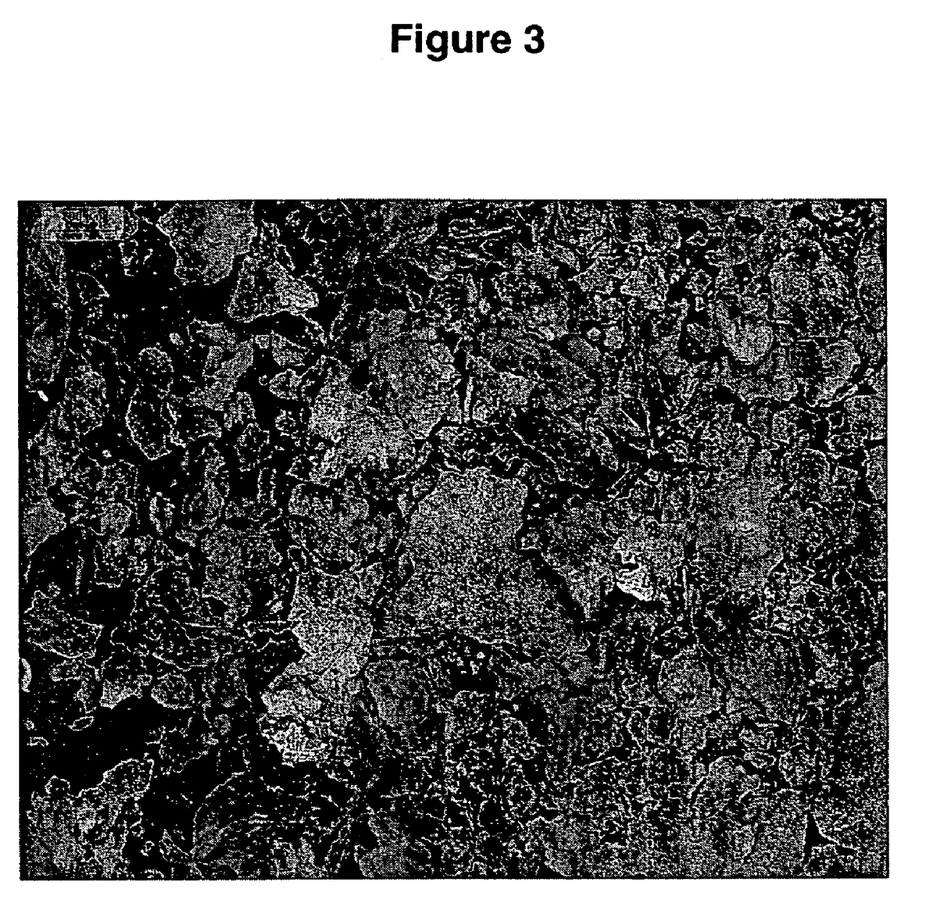
FIG. 3 is a scanning electron microscope image of an oxidant humidifier after operation in a fuel cell.

Degradation pathways present in the fuel cell system can result in contaminants that reduce the lifetime of the various components. FIG. 3 is a scanning electron microscope image of an oxidant humidifier after continued operation of a fuel cell system. Particles can be clearly seen on the surface of the humidifier. The smallest particles observed were 7 to 17 µm though many of the particles were hundreds of microns long. In particular, these particles formed downstream of a 40 µm particulate filter. Thus it is insufficient to simply rely on a particulate filter to eliminate contamination of the humidifier. Without being bound by theory, these particles may have formed by the growth of polymeric silica on the aluminum surfaces of the humidifier to form aluminosilicates. Particle formation would also be expected on other components of the fuel cell system and would not be specific to the humidifier.

Silica is a polymer with the basic repeating unit of $SiO_2$. There are both polymeric and monomeric forms of silica and can be represented as:

(1)

(2)

(3)

(4)

(5)

Of the monomeric forms of silica, formula 1 $H_2SiO_3$ is also known as mono-silicic acid and formula (2) $H_4SiO_4$ is also known as ortho-silicic acid.

Silica can be a difficult family of compounds to remove from water and can be present in three forms: dissolved, colloidal or suspended, or a combination thereof. Silica will not necessarily stay in one form in solution and may convert to another form by polymerization depending on the water conditions (temperature, pH, total alkalinity and metals concentration). Monomeric silica tends to be soluble whereas polymeric silica may be colloidal and granular silica may be suspended.

In addition silica can form insoluble metal silicates with some trace metals in solution or on metal surfaces. Basic "ortho" silicates are of the form $M_2SiO_4$ where M can be a divalent metal such as $Mg^{2+}$ or $Fe^{2+}$. Aluminum silicates are also very common though their structure is more complex. Further, metal silicates tend to be chemically stable, particularly within the temperature and pH conditions typically found within a fuel cell system.

Without being bound by theory, silica and silicates may be observed as a result of degradation of silicone used in other components within the fuel cell system, for example from silicone seals.

Silica may be removed from the water management subsystem by employing a silica absorber. For the purposes of this application, a silica absorber comprises a metal that removes silica from an aqueous solution thereof. Without being bound by theory, the mechanism by which the silica absorber removes the silica may be either chemically (for example, through the formation of metal silicates) or by physical mechanisms (for example, through adsorption on materials with high specific surfaces). Representative examples of silica absorbers include magnesium, iron and aluminum, their metal oxides and combinations thereof. In a more specific embodiment, the silica absorber comprises aluminum oxide (also known and referred to herein as alumina).

Figure 4:
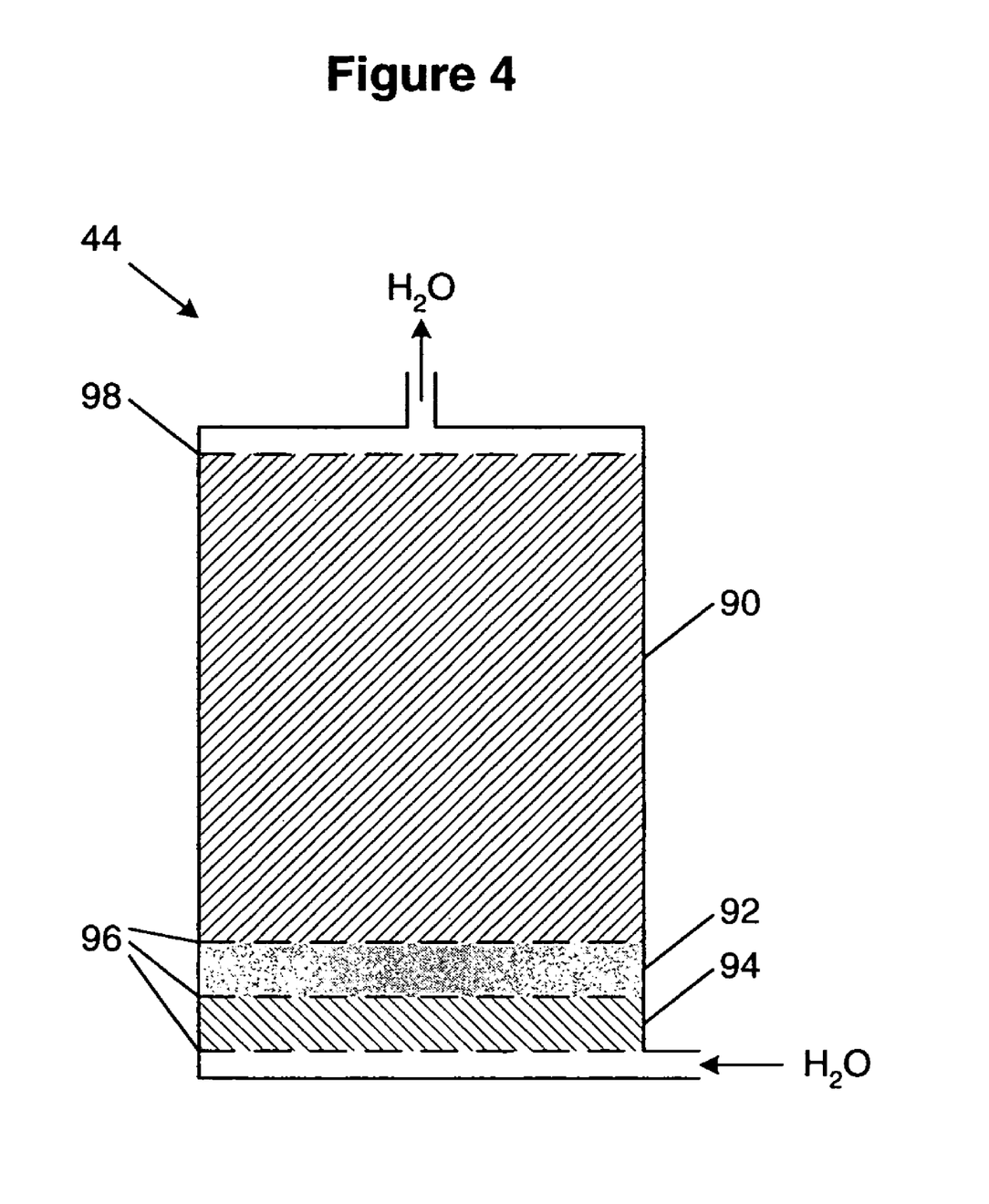
FIG. 4 is a cross-sectional illustrative view of a water filter of the present invention.

FIG. 4 is a schematic of a modified filter 44 comprising an ion exchange resin 90, activated carbon 92 and alumina granulate 94. The different compartments for ion exchange resin 90, activated carbon 92 and alumina granulate 94 are partitioned through the use of partition filters 96. Filter 44 further comprises intake filter 95 and exit filter 98 at the water inlet and water outlet respectively. Partition filters 96 and intake filter 95 may be, for example 100 μm filters whereas exit filter 98 may be, for example, a 25 μm filter. In the embodiment illustrated in FIG. 4, activated carbon 92 and alumina granulate 94 are 15 mm thick. PVDF spacers may be used (not shown) in making filter 44 and easily obtaining the correct thickness of layers 92 and 94. Each of the layers 92 and 94 may represent about 10% of the filter cartridge volume with the remaining 80% (approximately 120 mm) being filled with ion exchange resin 90.

Ion exchange resin 90 is made up of anion and cation resins, in approximately equal ratios. The resins remove both anionic and cationic contaminants. A typical resin is based on the styrene-divinyl benzene co-polymer though other resins such as acrylic resins are also used. Typically the resin has a bead structure composed of an inert skeleton with charged functional groups throughout its structure. In such a resin, the difference between the anion resin and the cation resin is the functional group attached to the benzene group.

The activated carbon 92 typically has a surface with a relatively high amount of polar functional groups that can attract contaminants of a similar polarity. Alumina granulate 94 may be, for example of the type Saint-Gobain-Norpro (SGN) SA62125. Alumina granulate SGN SA 62125 in particular has a chemical composition of γ-alumina with a surface area of 100 to 240 $m^2/g$ and a median pore diameter of 65 to 120 Angstroms. High surface areas for both the activated carbon and the alumina granulate is desired in order to increase the efficiency in which they remove contaminants from the water.

Water arriving from the water inlet flows through alumina granulate 94 and activated carbon 92. The large specific surface area of the two granulate beds 94 and 92 and the surface reaction between the aluminum ions and the silica causes the silica contaminants to become absorbed to the surface of the granules. Subsequently, the water flows through ion exchange resin 90 leading to the removal of other contaminants and is again filtered at exit filter 98. The purified water may then be used as needed in the various fuel cell subsystems.

Figure 5:
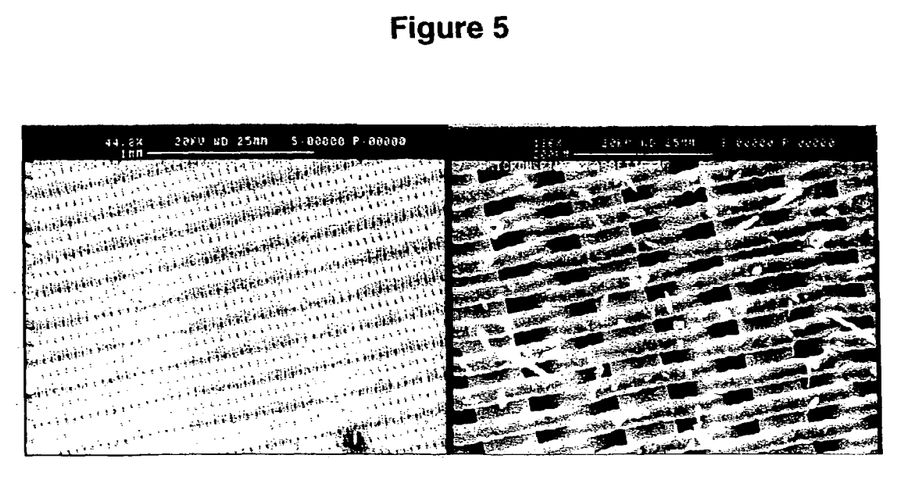
FIG. 5 is a scanning electron microscope image of a typical water filter after operation in a fuel cell system.
Figure 6:
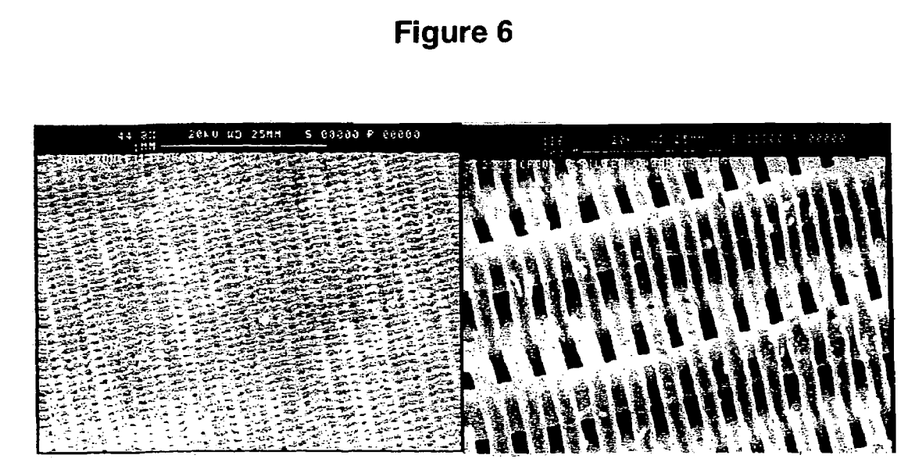
FIG. 6 is a scanning electron microscope image of a water filter of the present invention after operation in a fuel cell system.

Silica can also lead to clogging of filter 44, particularly from polymeric silica greater than 25 μm in diameter. To illustrate this and show the improvement of the modified water filter as in FIG. 4, two fuel cell systems were operated for 16 hours under normal operating conditions. In fuel cell system A, a conventional water filter was used without activated carbon 92 nor alumina granulate 94. In comparison, in fuel cell system B, a water filter as in FIG. 4 was used. Scanning electron microscope images were then taken of exit filter 98. FIG. 5 is the scanning electron microscope image for the filter used in system A whereas FIG. 6 is the scanning electron microscope image for the filter used in system B.

Even with a relatively short operation time of 16 hours, silica particles can clearly be seen in FIG. 5. In comparison, close inspection of FIG. 6 shows a significant reduction of silica present when the modified filter cartridge of the present invention is used. This would be expected to result in a significantly longer service life of water filter 44. In addition, absorption of silica at the water filter would be expected to result in reduced amounts of solubilized silica in the water thereby leading to reduced formation of metal silicates on downstream components.

Figure 7:
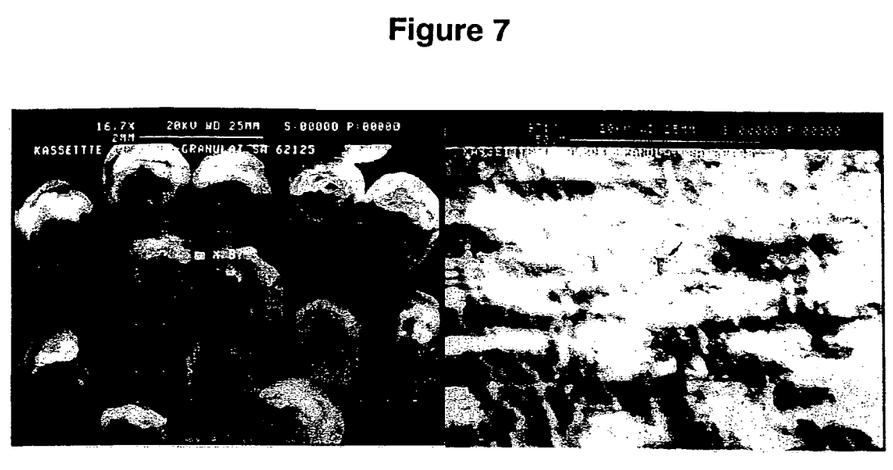
FIG. 7 is a scanning electron microscope image of alumina granulate particles from a water filter of the present invention after operation in a fuel cell system.
Figure 8:
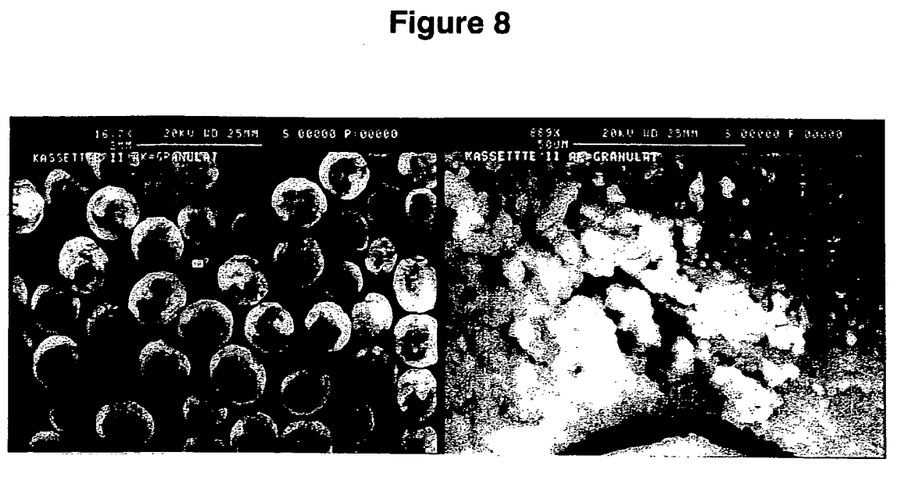
FIG. 8 is a scanning electron microscope image of activated carbon particles from a water filter of the present invention after operation in a fuel cell system.

FIG. 7 is a scanning electron microscope image of the alumina granulate from the modified filter cartridge in system B. The alumina granulate shows small surface bound silicon particles. FIG. 8 is a scanning electron microscope image of the activated carbon granulate from the same modified filter cartridge. As with the alumina granulate, the activated carbon also shows significant silica absorption. An SEM/EDX analysis (not shown) conducted on both the alumina granulate and the activated carbon showed significant silicon peaks on both materials.

The composition of the silica absorber can vary significantly without departing from the scope of the present invention. For example, only the alumina granulate may be present in the water filter without the activated carbon. In another embodiment (not shown), the alumina granulate and the activated carbon are mixed together within a single compartment and not separated as in FIG. 4.

Figure 2:
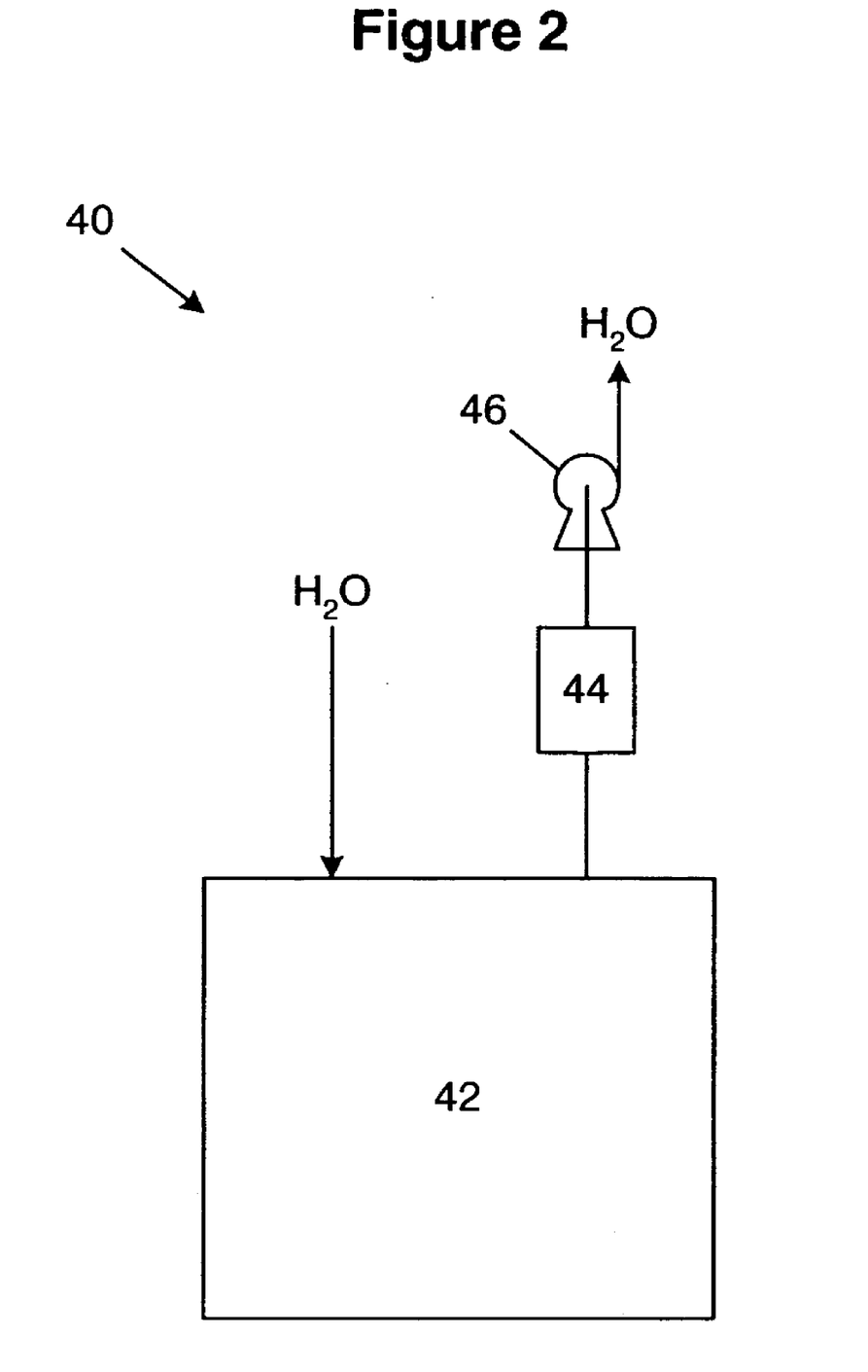
FIG. 2 is a schematic of a water management subsystem for a fuel cell system.

In addition, the location of the silica absorber can also vary significantly. For example, in other embodiments, the silica absorber is in a separate cartridge from a conventional water filter and upstream, downstream or both of the water filter. Similarly, the silica absorber may be upstream, downstream or both of water tank 42.

In another embodiment (not shown), replaceable exfoliated high surface area aluminum plates could be placed in water tank 42. This would allow the silica to plate out as an aluminosilicate before entering the filtration system. The aluminum plates could be replaced and washed in caustic or hydrofluoric acid periodically to regenerate them. However, aluminum fabrics tend to be expensive and not have as high a surface area as alumina granulate.

From the foregoing, it will be appreciated that, although specific embodiments of the invention have been described herein for purposes of illustration, various modifications may be made without deviating from the spirit and scope of the invention. Accordingly, the invention is not limited except as by the appended claims.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

What is claimed is:

1. An electrochemical fuel cell system comprising:
an electrochemical fuel cell stack; and
a water management subsystem;
wherein the water management subsystem comprises a water tank, a water filter including a silica absorber, and a pump all fluidly connected to one another;
wherein said silica absorber includes an alumina granulate having a chemical composition of γ-alumina with a surface area of 100 to 240 $m^2/g$ and a median pore diameter of 65 to 100 angstroms.

2. The electrochemical fuel cell system of claim 1 wherein the silica absorber is in the water filter.

3. The electrochemical fuel cell system of claim 1 wherein the silica absorber further comprises activated carbon.

4. The electrochemical fuel cell system of claim 3 wherein the activated carbon is downstream of the aluminum granulate.

5. The electrochemical fuel cell system of claim 1 wherein the water filter comprises a single cartridge comprising both the silica absorber and an ion-exchanger resin.

6. The electrochemical fuel cell system of claim 1 wherein the water management subsystem comprises deionized water.

7. The electrochemical fuel cell system of claim 1 further comprising a reactant humidifiation subsystem, wherein the water management subsystem supplies water to the reactant humidification subsystem.

8. The electrochemical fuel cell system of claim 7 wherein reactant humidification subsystem humidifies the oxidant stream.

9. The electrochemical fuel cell system of claim 7 wherein reactant humidification subsystem humidifies the fuel stream.

10. The electrochemical fuel cell system of claim 1 further comprising a fuel processing subsystem and wherein the water management subsystem supplies water to the fuel processing subsystem.

11. The electrochemical fuel cell system of claim 1 wherein the water management subsystem supplies water to the electrochemical fuel cell stack for cooling the electrochemical fuel cell stack.

* * * * *